(12) United States Patent
Mialhe et al.

(10) Patent No.: US 11,377,189 B2
(45) Date of Patent: Jul. 5, 2022

(54) AIRCRAFT FUSELAGE STRUCTURE HAVING A GRID-STIFFENED PANEL

(71) Applicants: Airbus Operations SAS, Toulouse (FR); Airbus Operations GmbH, Hamburg (DE)

(72) Inventors: Christophe Mialhe, Saint Sulpice (FR); Andreas Dresel, Wedel (DE)

(73) Assignee: AIRBUS OPERATIONS SAS, Toulouse (FR)

( * ) Notice: Subject to any disclaimer, the term of this patent is extended or adjusted under 35 U.S.C. 154(b) by 391 days.

(21) Appl. No.: 16/715,391

(22) Filed: Dec. 16, 2019

(65) Prior Publication Data

US 2020/0189711 A1 Jun. 18, 2020

(30) Foreign Application Priority Data

Dec. 18, 2018 (FR) ...................................... 1873174

(51) Int. Cl.
*B64C 1/06* (2006.01)
*B64F 5/10* (2017.01)
(Continued)

(52) U.S. Cl.
CPC ................ *B64C 1/06* (2013.01); *B21D 53/92* (2013.01); *B64C 1/061* (2013.01); *B64C 1/064* (2013.01); *B64C 1/12* (2013.01); *B64F 5/10* (2017.01)

(58) Field of Classification Search
CPC ........... B64C 1/06; B64C 1/061; B64C 1/064; B64C 1/12; B21D 53/92
See application file for complete search history.

(56) References Cited

U.S. PATENT DOCUMENTS

| 4,086,378 A | 4/1978 | Kam et al. |
| 5,562,264 A * | 10/1996 | Bietenhader ............. B64C 1/00 244/119 |

(Continued)

FOREIGN PATENT DOCUMENTS

| DE | 102009057018 A1 | 6/2011 |
| DE | 102012101914 A1 | 9/2013 |

(Continued)

OTHER PUBLICATIONS

French Search Report; priority document.

*Primary Examiner* — Michael H Wang
(74) *Attorney, Agent, or Firm* — Greer, Burns & Crain, Ltd.

(57) ABSTRACT

A structure for an aircraft fuselage, the structure comprising a skin having an outer face and an inner face machined as a grid-stiffened panel, a plurality of frames, each frame shaped as the cross section of the fuselage and the frames being arranged one after the other along a longitudinal direction of the fuselage. The outer perimeter of each frame is secured to the inner face, a plurality of stringers extend parallel to the longitudinal direction, each stringer extending across multiple frames, passing through these at an opening provided to that end in each frame, and each stringer is pressed against the inner face and secured thereto. In the upper part and in the lower part of the fuselage, a torsion box is provided extending parallel to the longitudinal direction, each torsion box comprising a horizontal plate and tabs which secure the plate to the inner face.

10 Claims, 4 Drawing Sheets

(51) Int. Cl.
*B21D 53/92* (2006.01)
*B64C 1/12* (2006.01)

(56) References Cited

U.S. PATENT DOCUMENTS

| | | | |
|---|---|---|---|
| 2016/0152315 A1* | 6/2016 | Martino Gonzalez | B64C 1/26 |
| | | | 244/119 |
| 2016/0362905 A1 | 12/2016 | Harper | |
| 2018/0065761 A1* | 3/2018 | Staal | B64F 5/40 |
| 2018/0170513 A1* | 6/2018 | Martino González | B64C 5/02 |
| 2019/0248463 A1* | 8/2019 | Staal | B64C 1/06 |
| 2022/0023931 A1* | 1/2022 | Peyron | B64D 33/10 |

FOREIGN PATENT DOCUMENTS

| | | | | |
|---|---|---|---|---|
| EP | 2634086 A1 * | 9/2013 | | B64C 1/064 |
| EP | 3106383 A1 | 12/2016 | | |
| EP | 3293105 A1 | 3/2018 | | |
| GB | 2196923 A | 5/1988 | | |

* cited by examiner

AIRCRAFT FUSELAGE STRUCTURE HAVING A GRID-STIFFENED PANEL

CROSS-REFERENCES TO RELATED APPLICATIONS

This application claims the benefit of the French patent application No. 1873174 filed on Dec. 18, 2018, the entire disclosures of which are incorporated herein by way of reference.

FIELD OF THE INVENTION

The present invention relates to a structure for a fuselage of an aircraft, to an aircraft comprising a fuselage created with a structure of this kind, and to a method for creating a structure of this kind.

BACKGROUND OF THE INVENTION

The structure of an aircraft, in particular of the fuselage, conventionally comprises a plurality of frames, a skin and numerous stiffeners. Each frame has the general shape of a circle and the frames are arranged one after the other along the longitudinal direction of the aircraft. Numerous stiffeners are secured between two adjacent frames and the skin is secured around the frames and to the stiffeners.

Although an architecture of this kind yields good results, in particular in terms of structural strength, it is desirable to find a different structure which is at least as strong structurally and, especially, more lightweight and less onerous to produce.

SUMMARY OF THE INVENTION

The present invention has an object of proposing an aircraft fuselage structure which is structurally strong and more lightweight than that of the prior art.

To that end, the invention proposes a structure for a fuselage of an aircraft, the structure comprising:
- a skin having an outer face and an inner face machined in the form of a grid-stiffened panel,
- a plurality of frames, each frame taking the shape of the cross section of the fuselage and the frames being arranged one after the other along a longitudinal direction X of the fuselage, the outer perimeter of each frame being secured to the inner face of the skin,
- a plurality of stringers extending parallel to the longitudinal direction X of the fuselage, each stringer extending across multiple frames, passing through these at an opening provided to that end in each frame, and each stringer being pressed against the inner face of the skin and secured thereto, and
- in the upper part and in the lower part of the fuselage, a torsion box which extends parallel to the longitudinal direction X of the fuselage, each torsion box comprising a horizontal plate and tabs which secure the plate to the inner face of the skin.

The particular combination of this structure is lightweight while being particularly strong.

Advantageously, at each intersection between a frame and a stringer, these two elements are secured to one another.

According to one particular embodiment, the grid-stiffened panel has first ribs forming a first grid-stiffened panel and second ribs, the height of the first ribs perpendicular to the inner face being less than the height of the second ribs perpendicular to the inner face.

According to another particular embodiment, the grid-stiffened panel has first ribs forming a grid-stiffened panel and second ribs forming a second grid-stiffened panel, the height of the first ribs perpendicular to the inner face being less than the height of the second ribs perpendicular to the inner face.

Advantageously, the skin has created in it holes for portholes and a passage for a door, a stringer is arranged above the line of holes, a stringer is arranged below the line of holes, a stringer is arranged at the level of the upper edge of the passage, a stringer is arranged at the level of an upper floor, and a stringer is arranged at the level of the lower floor of a hold.

Advantageously, each frame comprises a closed-section profile.

Advantageously, the closed section is in the form of a trapezium, of which one of the parallel sides is secured to the skin.

Advantageously, the structure comprises support triangles, each support triangle comprising a one-piece element with a straight edge extending horizontally, another straight edge extending vertically and a curved edge that is pressed against and secured to a frame.

The invention also proposes an aircraft comprising a fuselage comprising a structure according to one of the preceding variants.

The invention also proposes a method for producing the above structure, the production method comprising:
- a supply step in which a flat metal plate, the thickness of which is at least equal to the greatest height of the ribs of the grid-stiffened panel, is supplied,
- a rolling step in which the metal plate is deformed so as to adopt the curved shape of the skin,
- a flattening step in which the metal plate deformed in this manner is constrained in a flat position,
- a machining step in which the metal plate constrained in this manner is machined so as to create the grid-stiffened panel,
- a release step in which the metal plate is released so as to recover its curved shape and thus form the skin,
- a module creation step which comprises securing the frames next to one another on an assembly template and applying and securing the previously created skin to the outer perimeter of each frame secured in this manner, and
- an assembly step in which various modules created in this manner are arranged and secured next to one another with the stringers and the torsion boxes.

BRIEF DESCRIPTION OF THE DRAWINGS

The above-mentioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
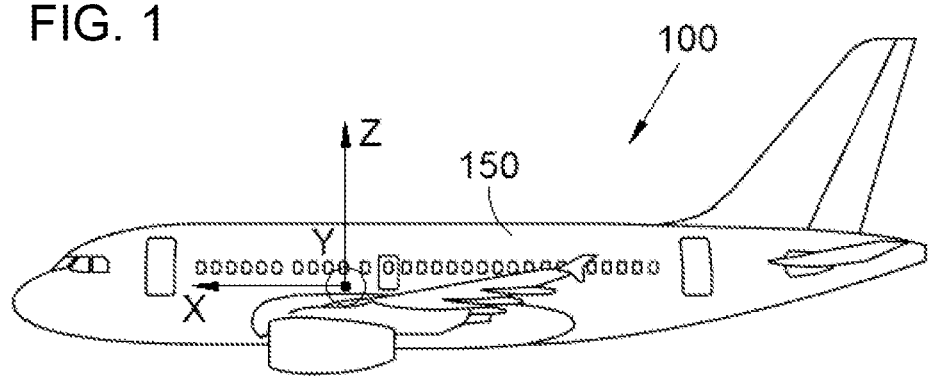
FIG. 1 is a side view of an aircraft according to the invention.

In the following description, terms relating to a position are considered in relation to an aircraft in a normal use position, that is to say, as shown in FIG. 1.

In the description that follows, and as is conventional, the X direction is the longitudinal direction of the aircraft and of the fuselage, with positive orientation in the direction of advance of the aircraft; the Y direction is the transverse direction of the aircraft and is horizontal when the aircraft is on the ground; the Z direction is the vertical direction when the aircraft is on the ground; these three directions X, Y and Z are mutually orthogonal.

FIG. 1 shows an aircraft 100 which comprises a fuselage 150.

The invention will be more particularly described in the context of the central, circular part of the fuselage 150, but it may equally apply when the fuselage is not circular, and at the ends of the fuselage 150.

Figure 2:
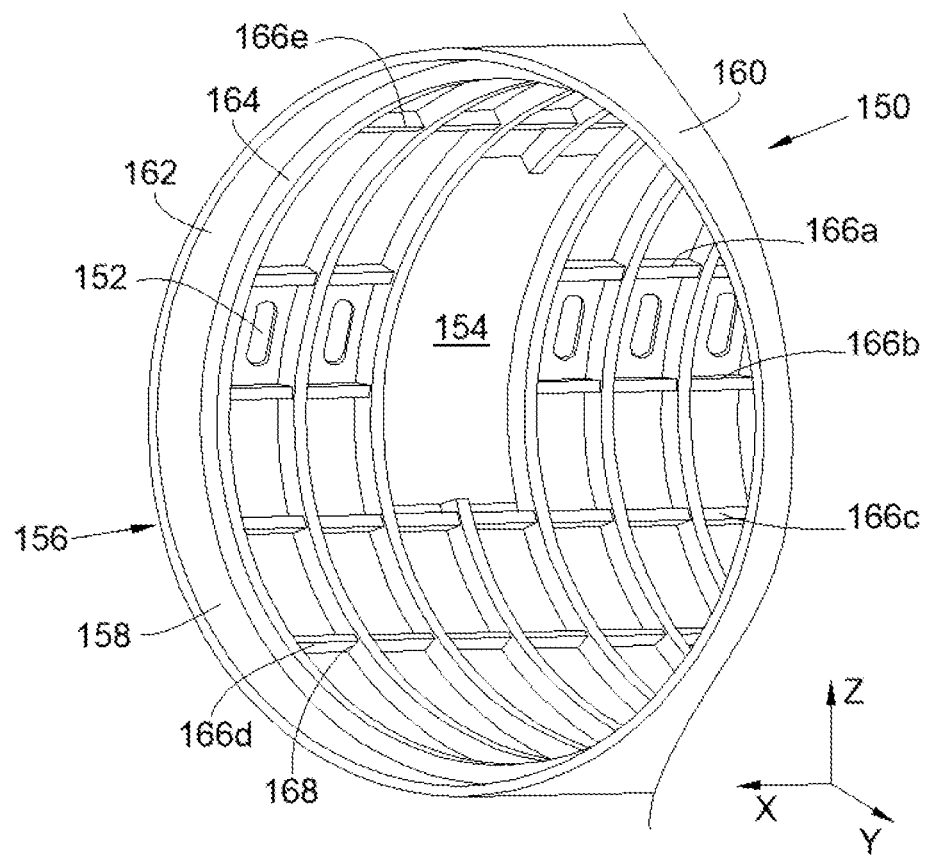
FIG. 2 is a perspective view of a portion of a fuselage comprising a structure according to the invention.

FIG. 2 shows the fuselage 150 which in this case is circular. In this case, the fuselage 150 comprises holes 152 for the installation of the portholes and a passage 154 for the installation of a door. Conventionally, the fuselage 150 is intended to comprise an upper floor and a hold, below the upper floor, which can be a passenger floor or a cargo floor.

The fuselage 150 comprises a structure 156 which comprises:
- a skin 158 having an outer face 160 oriented towards the exterior of the fuselage 150 and an inner face 162 oriented towards the interior of the fuselage 150,
- a plurality of frames 164, each frame 164 taking the shape of the cross section of the fuselage 150, in this case circular, and the frames 164 are arranged one after the other along the longitudinal direction X of the fuselage 150, and
- a plurality of stringers 166*a-e* extending parallel to the longitudinal direction X of the fuselage 150.

Thus, the skin 158 has created in it the holes 152 and the passage 154. Each frame 164 may comprise a single element or multiple elements secured so as to extend one another.

Figure 3:
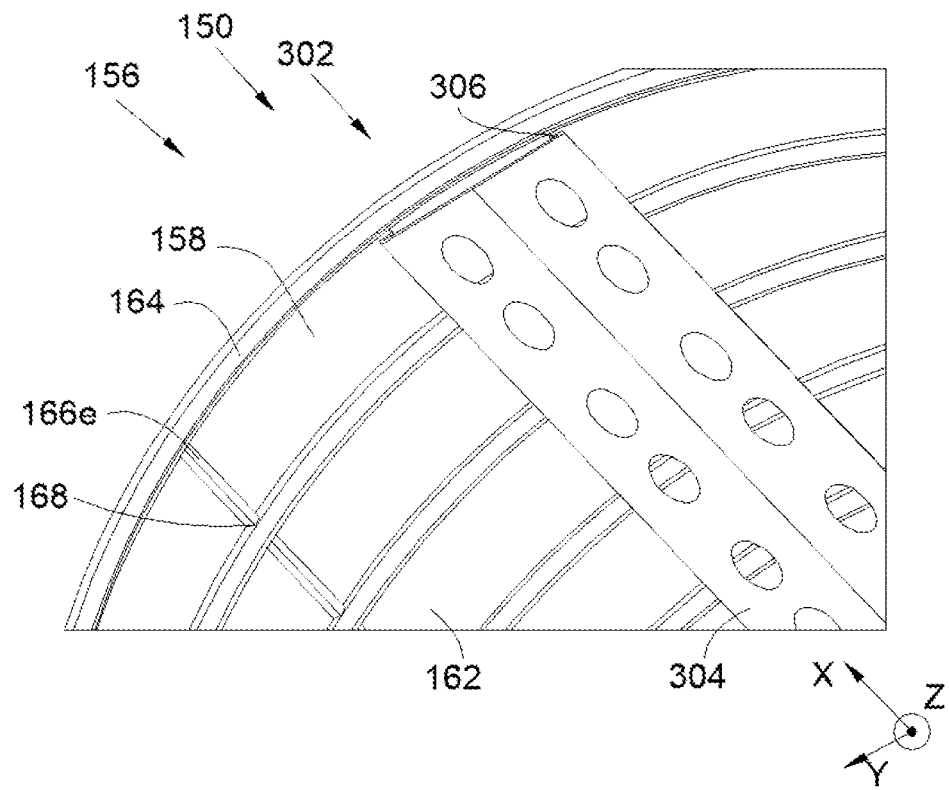
FIG. 3 is a perspective view of the upper part of the fuselage of FIG. 2.

FIG. 3 shows the upper part of the fuselage 150. The structure 156 also comprises, in the upper part and in the lower part of the fuselage 150, a torsion box 302 which extends parallel to the longitudinal direction X of the fuselage 150.

Figure 4:
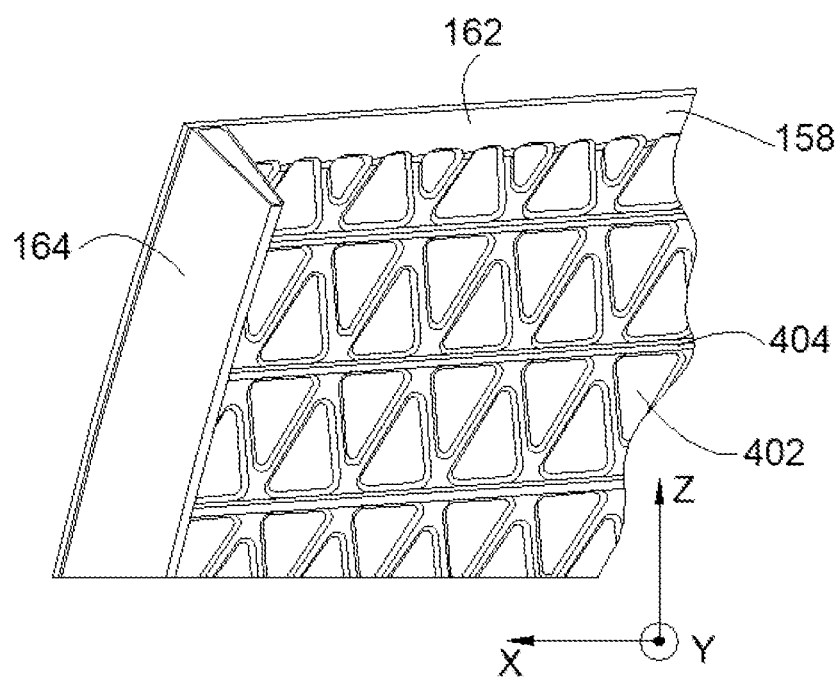
FIG. 4 is a perspective view of an example of a portion of a skin used for the structure according to the invention.

FIG. 4 shows the skin 158 and a frame 164. The inner face 162 is machined so as to form a grid-stiffened panel which reduces the weight of the skin 158 while ensuring high strength. This grid-stiffened panel makes it possible to dispense with the prior art stiffeners, and thus to save weight.

As shown in FIG. 4, the outer perimeter of each frame 164 is secured to the inner face 162 of the skin 158.

As shown in FIG. 2 and FIG. 3, each stringer 166*a-e* extends across multiple frames 164, passing through these at an opening 168 provided to that end in each frame 164. Each stringer 166*a-e* is pressed against the inner face 162 of the skin 158 and is secured thereto.

Each torsion box 302 comprises a plate 304 that extends in a plane parallel to the longitudinal axis, which in this case is horizontal. Each torsion box 302 also comprises, on either side of the median plane XZ of the fuselage 150, tabs 306 which secure the plate 304 to the inner face 162 of the skin 158. Each torsion box 302 constitutes an element which can compensate for a defect in the skin 158, and vice versa.

Each frame 164 passes between the plate 304 and the skin 158.

The particular architecture of the structure 156 makes it possible to obtain a structure that is more lightweight than in the case of the prior art, by eliminating the stiffeners. The torsion boxes 302 serve to compensate for the bending forces experienced by the fuselage 150. The stringers 166*a-e* serve to strengthen the structure 156 in the event of high loading. Moreover, since such a structure has greater stiffness, it is possible to space the frames 164 apart and thus save even more weight.

According to one preferred embodiment, at each intersection between a frame 164 and a stringer 166*a-e*, these two elements are secured to one another, that is to say, at each opening 168.

The various elements are secured to one another, for example, by the installation of rivets, by spot welding, by the installation of threaded or crimping fasteners, etc.

In the embodiment of FIG. 4, the grid-stiffened panel has first ribs 402 forming a first grid-stiffened panel and second ribs 404, the height of the first ribs 402 perpendicular to the inner face 162 being less than the height of the second ribs 404 perpendicular to the inner face 162. In one particular embodiment, the height of the second ribs 404 is equal to 5 mm, the height of the first ribs 402 is equal to 3 mm and the thickness of the skin 158 at the center of the triangles is equal to 1.2 mm.

In the embodiment of the invention presented in FIG. 4, the grid of the first grid-stiffened panel is made of triangles, and hence is in the form of an isogrid, but it is possible to provide other closed shapes such as rectangles, hexagons, or others.

The second ribs 404 comprise straight elements, but it is possible to use other geometries depending on structural requirements. For example, the orientation of the straight elements could be different, depending on the type of forces experienced by the skin 158.

For example, the lower part of the skin 158 will be loaded in compression and a longitudinal orientation of the straight elements will be preferred. The upper part of the skin 158 will be loaded in tension and a double orientation, longitudinal and transverse, of the straight elements will be preferred. Between the lower part and the upper part, the skin 158 will be loaded in shear and an orientation at 45° of the straight elements will be preferred.

According to another embodiment, which is not shown, the second ribs also form a second grid-stiffened panel, the grid comprising triangles, or other closed shapes such as rectangles, hexagons, or others.

According to one particular embodiment:
- a stringer 166*a* is arranged above the line of holes 152, and a stringer 166*b* is arranged below the line of holes 152,
- a stringer 166*e* is arranged at the level of the upper edge of the passage 154, that is to say, at the level of the lintel of the door when it is installed,
- a stringer 166*c* is arranged at the level of the upper floor in order to support the upper floor, in particular in the event of a crash, and
- a stringer 166*d* is arranged at the level of the lower floor of the hold in order to support the lower floor of the hold, in particular in the event of a crash.

Of course, depending on the geometry of the fuselage 150 and depending on the experienced loads, a different distribution and a different number of stringers are possible.

The stringer 166a, which is arranged above the line of holes 152, is positioned between the holes 152 and the stringer 166e arranged at the level of the upper edge of the passage 154. The stringer 166b, which is arranged below the line of holes 152, is positioned between the holes 152 and the stringer 166c arranged at the level of the upper floor.

Figure 7:
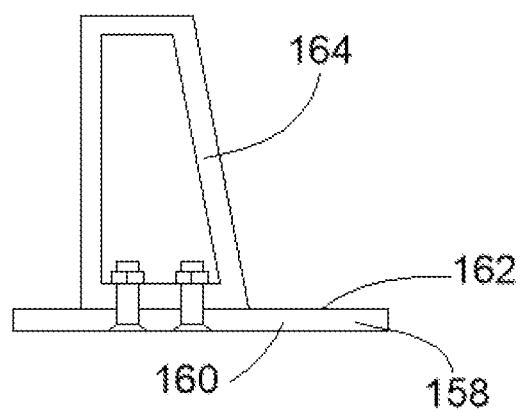
FIG. 7 is a view of the cross section of an example of a stringer used for the structure according to the invention.

As shown in FIG. 4 and FIG. 7, each frame 164 comprises a closed-section profile, which makes it possible to obtain a self-stable frame which keeps its shape even when a force is applied to it. In this case, the closed section is in the form of a trapezium, of which one of the parallel sides is secured to the skin 158.

In order to reduce the weight of each frame 164, windows can be created in the walls of the frame 164.

Figure 5:
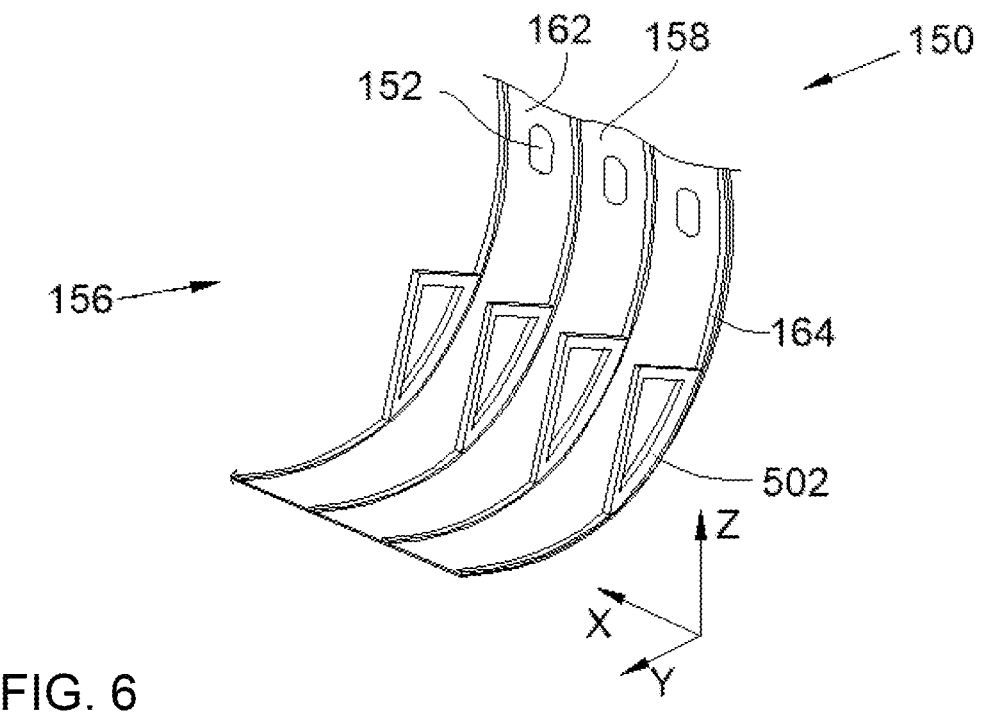
FIG. 5 is a perspective view of a portion of the fuselage of FIG. 2.

FIG. 5 shows a particular embodiment in which support triangles 502 are added to support the upper floor. Each support triangle 502 comprises a one-piece element that has two straight edges and one curved edge. One of the straight edges is horizontal and serves to support the upper floor, the other straight edge extends vertically and the curved edge is pressed against and secured to a frame 164.

Joists, in particular self-stable joists, can be secured between two support triangles 502 arranged on either side of the median plane XZ. These joists also serve for securing elements for the internal arrangement of the cabin, such as the seats, the toilets and the like.

Figure 6:
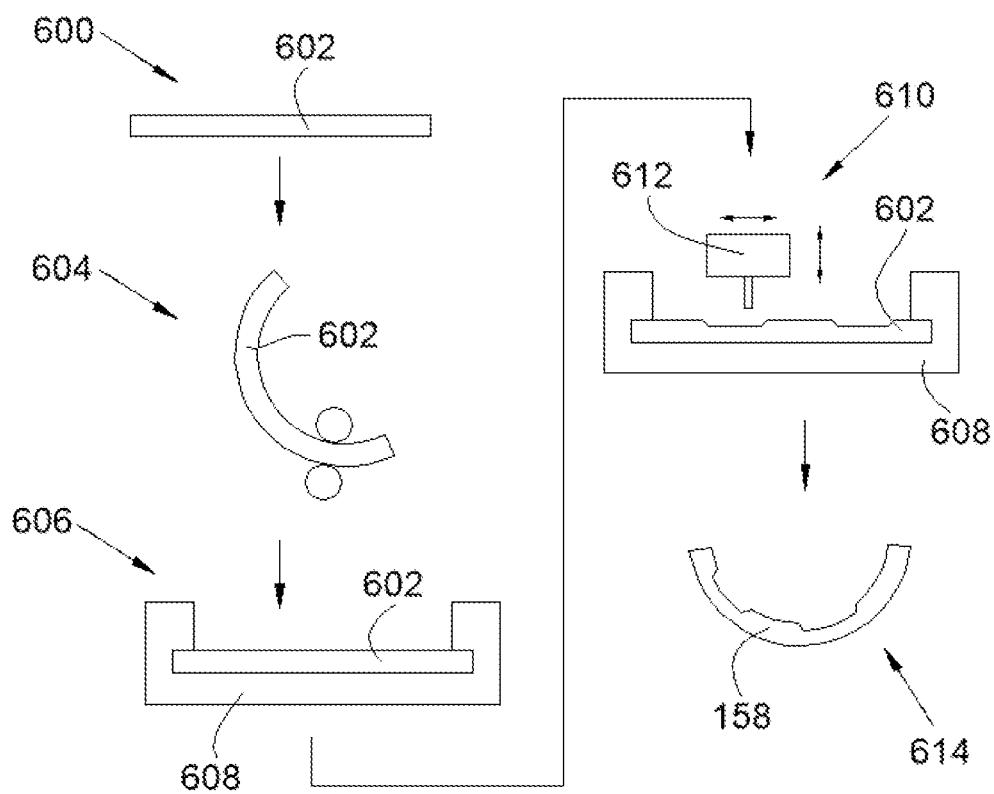
FIG. 6 is a schematic representation of a method for producing a skin used for the structure according to the invention.

FIG. 6 shows a method for producing the skin 158.

The production method comprises:
a supply step 600 in which a flat metal plate 602, the thickness of which is at least equal to the greatest height of the ribs 402, 404 of the grid-stiffened panel, is supplied,
a rolling step 604 in which the metal plate 602 is deformed so as to adopt the curved shape of the skin 158,
a flattening step 606 in which the metal plate 602 deformed in this manner is constrained in a flat position,
a machining step 610 in which the metal plate 602 constrained in this manner is machined so as to create the grid-stiffened panel on the inner face 162,
a release step 614 in which the metal plate 602 is released so as to recover its curved shape and thus form the skin 158.

The rolling step 604 is performed for example by passing the plate between rollers.

The flattening step 606 is performed, for example, by placing the metal plate 602 against a table 608 against which two opposite straight edges of the metal plate 602 are clamped.

The machining step 610 is performed using a tool 612 which moves over the table 608.

The creation of the structure 156 then continues with the creation of a module, which comprises securing the frames 164 next to one another on an assembly template and applying and securing the previously created skin 158 to the outer perimeter of each frame 164 secured in this manner.

During an assembly step, various modules created in this manner are then arranged and secured next to one another with the stringers 166a-e and the torsion boxes 302 so as to form the structure 156.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure for a fuselage of an aircraft, said structure comprising:
a skin having an outer face and an inner face machined as a grid-stiffened panel,
a plurality of frames, each frame taking a shape of a cross section of the fuselage and the frames being arranged one after another along a longitudinal direction of the fuselage, an outer perimeter of each frame being secured to the inner face of the skin,
a plurality of stringers extending parallel to the longitudinal direction of the fuselage, each stringer extending across multiple frames, passing through the frames at an opening provided to that end in each frame, and each stringer being pressed against the inner face of the skin and secured thereto, and
in an upper part and in a lower part of the fuselage, a torsion box which extends parallel to the longitudinal direction of the fuselage, each torsion box comprising a horizontal plate and tabs which secure the plate to the inner face of the skin.

2. The structure according to claim 1, wherein, at each intersection between one of the plurality of frames and one of the plurality of stringers, these two elements are secured to one another.

3. The structure according to claim 1, wherein the grid-stiffened panel has first ribs forming a first grid-stiffened panel and second ribs, a height of the first ribs perpendicular to the inner face being less than a height of the second ribs perpendicular to the inner face.

4. The structure according to claim 1, wherein the grid-stiffened panel has first ribs forming a first grid-stiffened panel and second ribs forming a second grid-stiffened panel, a height of the first ribs perpendicular to the inner face being less than a height of the second ribs perpendicular to the inner face.

5. The structure according to claim 1,
wherein the skin comprises holes for portholes and a passage for a door,
wherein a first stringer of the plurality of stringers is arranged above the line of holes,
wherein a second stringer of the plurality of stringers is arranged below the line of holes,
wherein a third stringer of the plurality of stringers is arranged at a level of an upper edge of the passage,
wherein a fourth stringer of the plurality of stringers is arranged at a level of an upper floor, and
wherein a fifth stringer of the plurality of stringers is arranged at a level of a lower floor of a hold.

6. The structure according to claim 1, wherein each frame comprises a closed-section profile.

7. The structure according to claim 6, wherein the closed-section profile is in the form of a trapezium having two parallel sides, of which one of the parallel sides is secured to the skin.

8. The structure according to claim 1, further comprising support triangles, each support triangle comprising a one-piece element with a straight edge extending horizontally, another straight edge extending vertically and a curved edge that is pressed against and secured to a frame.

9. An aircraft comprising a fuselage comprising a structure according to claim 1.

10. A method for producing a structure according to claim 1, said production method comprising:
- supplying a flat metal plate, a thickness of which is at least equal to a greatest height of ribs of the grid-stiffened panel,
- rolling of the metal plate to deform the metal plate so as to adopt a curved shape of the skin,
- flattening the metal plate to deform and constrain the metal plate into a flat position,
- machining the constrained metal plate to create the grid-stiffened panel,
- releasing the metal plate to recover its curved shape and thus form the skin,
- creating a module comprising securing the frames next to one another on an assembly template and applying and securing the previously created skin to an outer perimeter of each frame secured in this manner, and
- assembling various modules created in this manner by arranging and securing the modules next to one another with the stringers and the torsion boxes.

* * * * *